United States Patent
Klais

(10) Patent No.: US 6,851,687 B2
(45) Date of Patent: Feb. 8, 2005

(54) OFF-AXIS CAM ADJUSTMENT SYSTEM AND METHOD

(75) Inventor: Matthew E Klais, Waterford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/306,107

(22) Filed: Nov. 26, 2002

(65) Prior Publication Data

US 2004/0100051 A1 May 27, 2004

(51) Int. Cl.$^7$ .............................................. B62D 17/00
(52) U.S. Cl. .................................................. 280/86.754
(58) Field of Search ........................ 280/86.751–86.757

(56) References Cited

U.S. PATENT DOCUMENTS

| | | | | |
|---|---|---|---|---|
| 4,650,208 A | * | 3/1987 | Mason .................. | 280/86.757 |
| 4,695,073 A | * | 9/1987 | Pettibone et al. ...... | 280/86.757 |
| 4,754,991 A | * | 7/1988 | Jordan .................. | 280/86.756 |
| 4,869,527 A | * | 9/1989 | Coddens ................ | 280/86.753 |
| RE33,179 E | * | 3/1990 | Pettibone ............... | 280/87.753 |
| 5,052,711 A | * | 10/1991 | Pirkey et al. .......... | 280/86.753 |
| 5,647,606 A | * | 7/1997 | Jordan .................. | 280/86.751 |
| 5,651,561 A | * | 7/1997 | Tandy et al. ........... | 280/86.753 |
| 5,775,719 A | * | 7/1998 | Holden .................. | 280/86.75 |
| 5,839,749 A | * | 11/1998 | Lyu ....................... | 280/86.753 |
| 6,409,189 B1 | * | 6/2002 | Orimoto et al. ....... | 280/86.751 |
| 6,478,318 B1 | * | 11/2002 | Allman et al. ......... | 280/86.751 |

* cited by examiner

Primary Examiner—Paul N. Dickson
Assistant Examiner—Laura B. Rosenberg
(74) Attorney, Agent, or Firm—Edwin W. Bacon, Jr.

(57) ABSTRACT

A system and method for adjusting at least one of a camber and a caster of a suspension system. The system includes a lower control arm and a suspension member coupled to the lower control arm. The system also includes a plate or plates defining a slot, the slot having a cam retaining element. In addition, the system includes one or more cams retained by the cam retaining element, the cam or cams defining an off-axis opening. The system also includes a bolt extending through the slot and through the off-axis opening in the cam. Upon rotation of the cam, the at least one plate is caused to move relative to the suspension member, which in turn causes the suspension member to move relative to the lower control arm.

14 Claims, 3 Drawing Sheets

OFF-AXIS CAM ADJUSTMENT SYSTEM AND METHOD

FIELD OF THE INVENTION

The present invention relates to an off-axis cam adjustment system and method. More specifically, the present invention relates to a lower control arm camber and caster adjustment mechanism for a suspension system.

BACKGROUND INFORMATION

Conventional suspension systems, such as for motor vehicles, typically provide a camber and a caster to the wheels of the motor vehicle. Camber is the setting of the wheels closer together at the bottom than at the top. Caster is the angle of the steering axis of a wheel from its vertical viewed from a lateral side of the vehicle, and usually is manifested by a slight, typically backwards, tilt of the upper end of a kingbolt for giving directional stability to the front wheels.

Conventional suspension systems typically enable the camber and caster of the wheels to be adjusted. These adjustments are often necessary due to the shocks and vibrations experienced by the motor vehicle, which may tend to cause the camber and caster of the wheels to change, thereby requiring realignment. Several types of suspension systems provide such adjustability. One such type of conventional suspension, such as that shown and described in U.S. Pat. No. 6,367,826 entitled "Camber/Caster Adjuster," includes an alignment adjuster for wheel alignment of a motor vehicle, in which the alignment adjuster includes a shaft that is moveable within an elongated slot. The adjustable member is a lower control arm that is attached via a bushing to the shaft. The shaft includes a pinion gear that contacts a rack element that is disposed near the elongated slot. Rotation of the shaft initiates lateral movement of the shaft in the elongated slot.

However, conventional camber and caster adjustment mechanisms do not provide sufficient precision with respect to adjustability. Furthermore, conventional camber and caster adjustment mechanisms do not provide sufficient ease of adjustment.

Therefore, there exists a need for an improved camber and caster adjustment mechanism for the suspension system of a motor vehicle.

It is therefore an object of the present invention to provide an improved camber and caster adjustment mechanism for the suspension system of a motor vehicle.

It is another object of the present invention to improved the precision with which the camber and caster of the suspension system of a motor vehicle may be adjusted.

It is still another object of the present invention to increase the amount by which the camber and caster of the suspension system of a motor vehicle may be adjusted.

It is still another object of the present invention to provide a camber and caster adjustment mechanism for the suspension system of a motor vehicle that is easier to adjust than conventional camber and caster adjustment mechanisms.

SUMMARY OF THE INVENTION

The above and other beneficial objects of the present invention are achieved by providing a system and method as described herein. The present invention, according to one example embodiment thereof, relates to a system and method for adjusting at least one of a camber and a caster of a suspension system, such as for a motor vehicle. The system includes a lower control arm and a suspension member coupled to the lower control arm. The system also includes a plate or plates including a slot, the slot having a cam retaining element. In addition, the system includes one or more cams retained by the cam retaining element, the cam or cams providing an off-axis opening. The one or more cams may be round. The system also includes a bolt extending through the slot and through the off-axis opening in the cam. Upon rotation of the cam, the at least one plate is caused to move relative to the suspension member, which in turn causes the suspension member to move relative to the lower control arm.

In one example embodiment, the system includes a pair of plates, each of the plates including slots, and each of the slots having cam retaining elements. The system may also include a pair of cams retained by the cam retaining elements, each of the pair of cams providing an off-axis opening. In this manner, the rotation of the cams cause the pair of plates to move evenly relative to the suspension member which in turn causes the suspension member to move evenly relative to the lower control arm. The cam retaining elements may include a pair of elements that are elevated relative to a surface of the plates. The pair of elevated elements are disposed at a distance from each other that is equal to, or slightly less than, an outer diameter of the pair of cams, such that the cams may fit rotatably therein.

The system may also include a second suspension member coupled to the lower control arm in, e.g., the same manner that the first suspension member is coupled thereto. In this example embodiment, the system is configured such that relative movement of the lower control arm with respect to both the suspension member and the second suspension member causes an adjustment to the camber of the suspension system, while relative movement of the lower control arm with respect to one of the suspension member and the second suspension member causes an adjustment to the caster of the suspension system.

DETAILED DESCRIPTION

Figure 1:
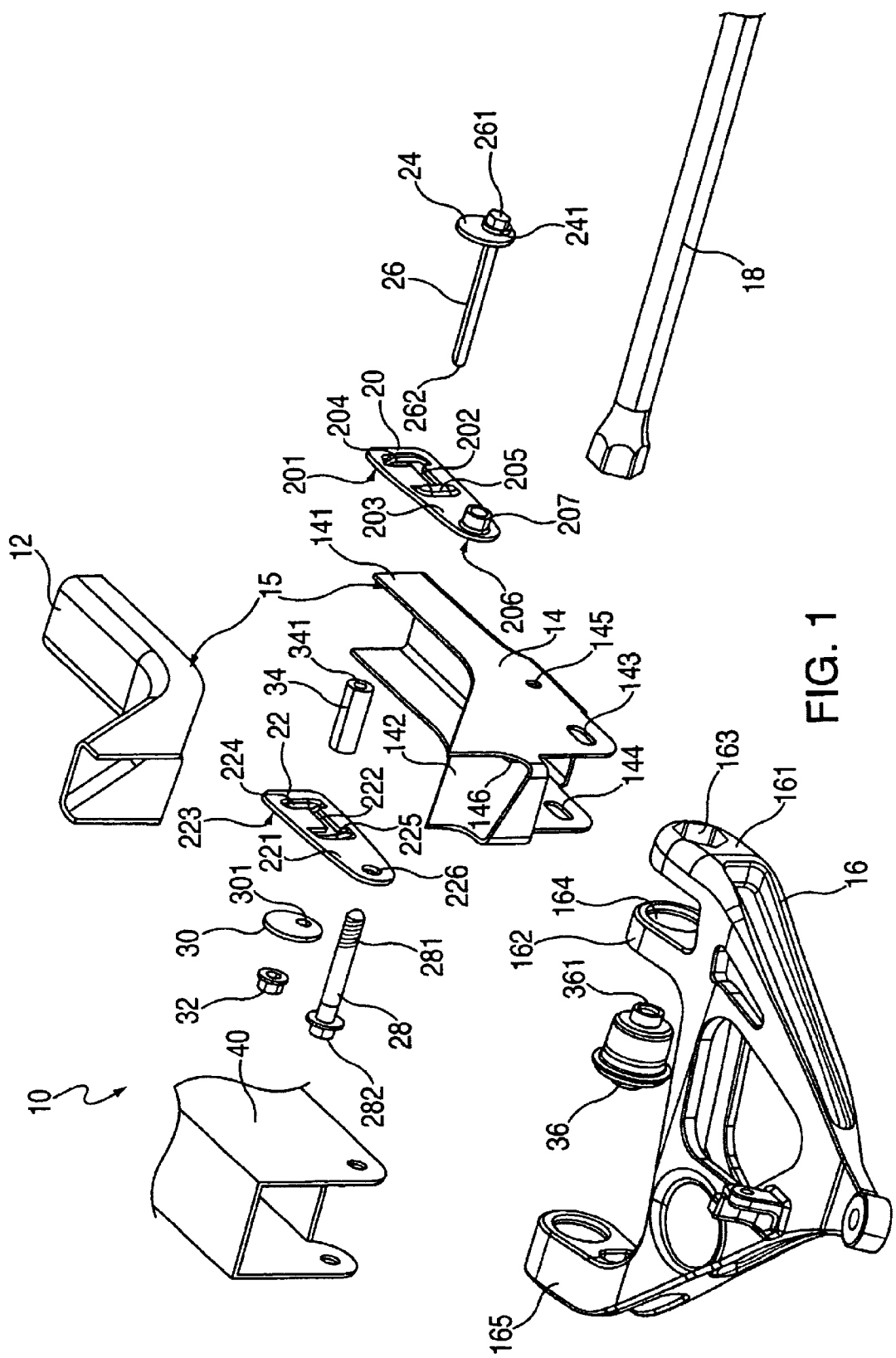
FIG. 1 is an exploded view that illustrates various elements of an off-axis cam adjustment system, in accordance with one example embodiment of the present invention.

FIG. 1 illustrates an exploded view of a system 10, e.g., an adjustment mechanism, for the suspension system of an automobile, according to one example embodiment of the present invention. In the example embodiment shown, the system 10 includes an upper suspension cross-member component 12 that mates with a lower suspension cross-member component 14 to form a suspension cross-member 15. The lower suspension cross-member component 14 has a pair of vertically-disposed sidewalls 141, 142. The sidewalls 141, 142 include respective slotted openings 143, 144 that are disposed so as to be generally opposite from each other. In addition, the sidewalls 141, 142 include respective round openings 145, 146 that are disposed so as to be generally opposite from each other.

The system 10 also includes a lower control arm 16 that is configured to engage the suspension cross-member 15.

Specifically, the lower control arm 16 includes a first arm 161 and a second arm 162 that extend from the lower control arm 16. The first arm 161 and the second arm 162 are disposed so as to be generally parallel relative to each other at a predetermined distance from each other. The first arm 161 has an orifice, e.g., hexagonally-shaped, that is configured to receive a corresponding and complementary end, e.g., hexagonally-shaped, of a torsion bar 18. The second arm 162 has an opening 164 that is configured to receive a lower control arm bushing 36. The lower control arm bushing 36 has an axial bore 361. The lower control arm 16 also has a third arm 165. In addition, the third arm 165 of the lower control arm 16 is configured to adjustably couple to a second suspension cross-member 40 of the suspension system. However, for the purposes of clarity, the specific details of the adjustment mechanism for this second suspension cross-member are not shown in FIG. 1. The second suspension cross-member 40 may include an adjustment mechanism, which may be similar to the mechanism provided and described herein with respect to the suspension cross-member 15.

The system 10 also includes a first reaction plate 20 and a second reaction plate 22. The first reaction plate 20 has a surface 201 that is configured to abut the outer surface of the vertically-disposed sidewall 141 of the lower suspension cross-member component 14. The surface 201 and the outer surface of the sidewall 141 may be flat. Furthermore, the first reaction plate 20 has an operative surface 203 disposed on the opposite side of the first reaction plate 20. The first reaction plate 20 also includes a slot 202. At opposite ends of the slot 202 are a pair of cam retaining elements 204, 205 that are slightly elevated relative to the operative surface 203. The first reaction plate 20 also includes a through-hole 206. Mounted over the through-hole 206, on the operative surface 203, is a threaded boss 207.

The second reaction plate 22 has a flat surface 221 that is configured to abut the outer surface of the vertically-disposed sidewall 142 of the lower suspension cross-member component 14. The surface 221 and the outer surface of the sidewall 141 may be flat. Furthermore, the second reaction plate 22 has an operative surface 223 disposed on the opposite side of the second reaction plate 22. The second reaction plate 22 also includes a slot 222. At opposite ends of the slot 222 are a pair of cam retaining elements 224, 225 that are slightly elevated relative to the operative surface 223. The second reaction plate 22 also includes a through-hole 226.

The system 10 also includes a bolt 26 having a head 261 and a threaded end 262. A first cam 24 is configured to be disposed on the bolt 26 adjacent to the head 201, and a second cam 30 is configured to be disposed on the threaded end 262 of the bolt 26 and to be held in place by a nut 32. The first and the second cams 24, 30 have off-axis openings 241, 301, respectively, disposed therethrough, e.g., the off-axis openings 241, 301 are not positioned in the center of the first and second cams 24, 30. In addition, the first and the second cams 24, 30 have outer diameters that are approximately equal to or slightly less than the distance between the cam retaining elements 204, 205 of the first reaction plate 20 and the cam retaining elements 224, 225 of the second reaction plate 22, respectively. It should be understood that, while the preferred example embodiment of the present invention includes cams 24, 30 that are round, other shapes may be provided.

The system 10 also includes a sleeve 34 having an axial bore 341 with an inner diameter slightly larger than the outer diameter of the bolt 26. The sleeve 34 has a length which is approximately equal to or slightly less than the distance between the inner surfaces of the vertically-disposed sidewalls 141, 142 of the lower suspension cross-member component 14. The system 10 also includes a bolt 28 having a head 282 and a threaded end 281. The threaded end 281 of the bolt 28 is configured to extend through the through-hole 226 of the second reaction plate 22, through the slots 143, 144 of the sidewalls 141, 142, respectively, through the axial bore 361 of bushing 36, and to engage the threaded boss 207 on the operative surface 203 of the first reaction plate 20.

Figure 2:
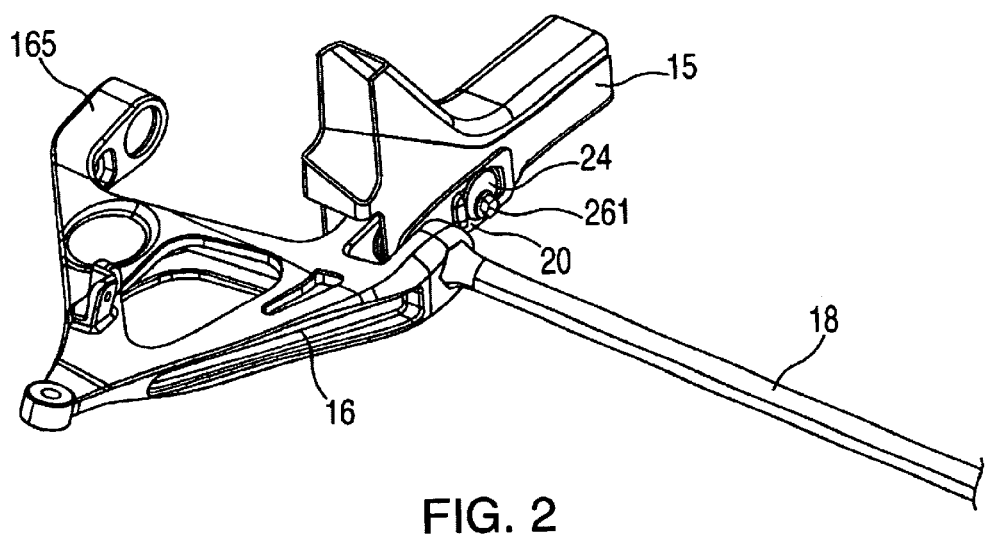
FIG. 2 illustrates an assembled view of the system illustrated in FIG. 1, viewed from right front perspective.
Figure 3:
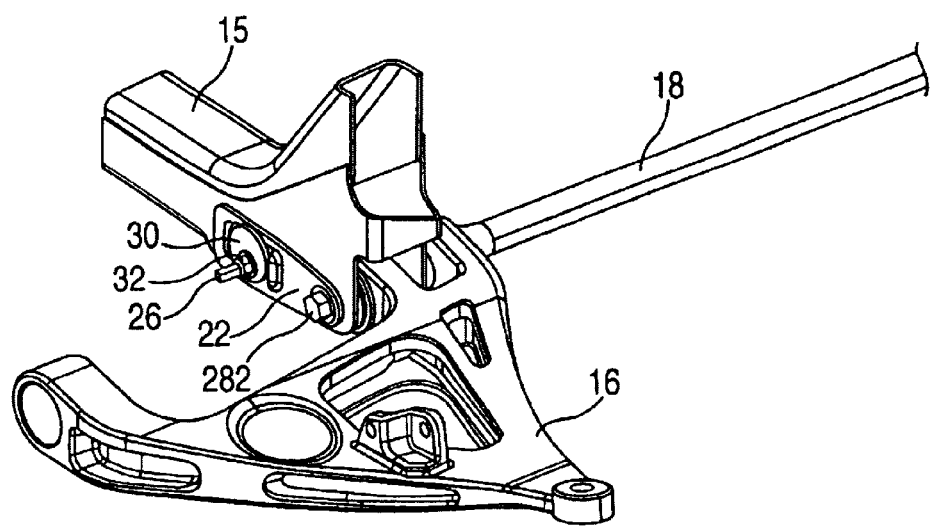
FIG. 3 illustrates an assembled view of the system illustrated in FIG. 1, viewed from left front perspective.

FIGS. 2 and 3 illustrate assembled views of the system 10 illustrated in FIG. 1, viewed from right front perspective and the left front perspective, respectively. As shown in FIG. 2, the upper suspension cross-member component 12 mates with the lower suspension cross-member component 14 to form the assembled suspension cross-member 15. The suspension cross-member 15 is configured to be fixedly attached to the motor vehicle. The surface 201 of the first reaction plate 20 is positioned against the outer surface of the vertically-disposed sidewall 141 of the lower suspension cross-member component 14 such that the through-hole 206 and the slot 206 of the first reaction plate 20 line up with the slot 143 and the hole 145 of the sidewall 141, respectively. Likewise, the flat surface 221 of the second reaction plate 22 is positioned against the flat outer surface of the vertically-disposed sidewall 142 of the lower suspension cross-member component 14 such that the through-hole 226 and the slot 222 of the second reaction plate 20 line up with the slot 144 and the round hole 146 of the sidewall 142, respectively. The bolt 26 is inserted through the off-axis opening 241 in the first cam 24, through the slot 202 of the first reaction plate 20, through the hole 145 in the sidewall 141, through the axial bore 341 of the sleeve 34, through the slot 222 of the second reaction plate 22 and through the off-axis opening 301 of cam 30. The nut 32 engages the threaded end 32 of the bolt 26. When the nut 32 is tightened on the threaded end 262 of the bolt 26, the cams 24, 30 are maintained in position against the operative surfaces 203, 223 of the first and second reaction plates 20, 22, respectively. In addition, the cam 24 is maintained between the cam retaining elements 204, 205 of the first reaction plate 20, while the cam 30 is maintained between the cam retaining elements 224, 225 of the second reaction plate 22.

In addition, the lower control arm 16 is adjustably coupled to the suspension cross-member 15. Specifically, the lower control arm bushing 36 is inserted into the opening 164 in the second arm 162 of the lower control arm 16. The bolt 28 is inserted through the through-hole 226 of the second reaction plate 22, through the slot 144 of the sidewall 142, through the axial bore 361 of the lower control arm bushing 36, through the slot 143 of the sidewall 141, and through the through-hole 206 of the first reaction plate 20. The threaded end 281 of the bolt 28 engages the threaded boss 207 mounted on the operative surface 203 of the first reaction plate 20, and is tightened to maintain the lower control arm 16 coupled to the suspension cross-member 15.

As previously stated, the system 10 may provide a adjustment mechanism for the suspension system of an automobile, according to one example embodiment of the present invention. More specifically, the system 10 may provide adjustability of the camber and caster of the lower control arm 16. In order to perform such an adjustment, the nut 32, which is typically maintained tightly on the bolt 26, is loosened slightly. Next, the bolt 28, which is typically maintained tightly by the threaded boss 207, is also loosened slightly. The position of the lower control arm 16 relative to the suspension cross-member 15 is then adjusted by the turning of the first or second cam 24, 30 in a selected direction. Turning the bolt 26 causes the cams 24, 30 to rotate around the center of the off-axis openings 241, 301 defined by the cams 24, 30. Because the openings 241, 301 are off-axis, and because the bolt 26 is maintained within openings 145, 146 of the sidewalls 141, 142, the turning movement of the cams 24, 30 causes horizontal movement of the first and second reaction plates 20, 22, respectively. Furthermore, the horizontal movement of the first and second reaction plates 20, 22 causes the bolt 28, which is fixedly attached to the lower control arm 16, to move horizontally within the slots 143, 144 of the sidewalls 141, 142, respectively. In this manner, the suspension cross-member 15 is caused to move relative to the lower control arm 16.

An adjustment may also be made, in like or different fashion, with respect to the third arm 165 of the lower control arm 16 and the second suspension cross-member 40, depending on the desired adjustment to the camber and caster. Specifically, if it is desired to change only the camber of the suspension system, then an adjustment may be made to the lower control arm 16 with respect to both the suspension cross-member 15 and the second cross-member 40 that is adjustably coupled to the third arm 165 of the lower control arm 16. If, on the other hand, it is desired to change both the camber and the caster of the suspension system, then an adjustment may be made to the lower control arm 16 with respect to one or the other of the suspension cross-member 15 and the second cross-member 40. Once the desired camber or caster is achieved, the bolt 28 is tightened with respect to the threaded boss 207, while the first and second cams 24, 30 are held in position. Next, the first and second cams 24, 30 are locked into position by tightening the nut 32 on the threaded end 262 of the bolt 26.

The system 10 may improve the precision with which the lower control arm 16 may be adjusted relative to the suspension cross-member 15. For instance, the turning of the first and second cams 24, 30 in order to cause the first and second reaction plates 20, 22 to move horizontally may enable precise adjustments of the position of the lower control arm 16 relative to the suspension cross-member 15. In addition, the system 10 may provide an additional amount of camber and caster adjustment compared to the conventional camber and caster adjustment mechanisms for suspension systems. Depending on the diameter of the cams 24, 30 and on the distance between the off-axis openings 241, 301 and the actual center axes of the cams 24, 30, the system 10 of the present invention may enable the suspension cross-member 15 to move relative to the lower control arm 16 a significantly larger distance than conventional suspension systems, thereby enabling a larger adjustment to the camber and caster of the wheels of the motor vehicle.

Furthermore, the use of the off-axis openings 241, 301 in the first and second cams 24, 36 prevents the cams from slipping, and thus the position of the lower control arm 16 relative to the suspension cross-member 15 from changing inadvertently, when the first and second cams 24, 30 are being tightened. Cams may have a tendency to slip when being tightened in a conventional camber and caster adjustment mechanisms of this type.

Still further, the system 10 may not require the use of a back-up wrench when tightening the bolt 28. Conventional adjustment mechanisms of this type may require that an operator employ a back-up wrench in order to tighten a bolt that holds a lower control arm in position relative to a suspension cross-member. However, the position of the torsion bar 18 in a conventional in-line torsion bar system renders it very difficult to use a back-up wrench on a nut at the end of the bolt 28. In contrast, in accordance with one example embodiment of the present invention, the bolt 28 engages the threaded boss 207 on the operative surface 203 of the first reaction plate 20. The threaded boss 207 is fixedly attached to the operative surface 203 of the first reaction plate 20 and thus does not rotate. As a result, the bolt 28 may be tightened without requiring that the threaded boss 207 be held in place by a back-up wrench.

Thus, the several aforementioned objects and advantages of the present invention are most effectively attained. Those skilled in the art will appreciate that numerous modifications of the exemplary embodiments described hereinabove may be made without departing from the spirit and scope of the invention. Although various exemplary embodiments of the present invention have been described and disclosed in detail herein, it should be understood that this invention is in no sense limited thereby and that its scope is to be determined by that of the appended claims.

What is claimed is:

1. A system for adjusting at least one of a camber and a caster of a suspension system, comprising:
    a control arm;
    at least one plate including an opening, a slot, and a cam retaining element;
    a suspension member coupled to the control arm;
    at least one cam retained by the cam retaining element and including an off-axis opening; and
    a bolt extending through the slot and through the off-axis opening, and
    a second bolt extending through at least one opening in the control arm, at least one slot in the suspension member, and the opening in the at least one plate,
    wherein a rotation of the cam causes the plate to move relative to the suspension member to cause relative movement between the suspension member and the control arm.

2. The system of claim 1, wherein the plate includes a pair of plates, each plate including an opening, a slot, and cam retaining elements, the at least one cam including a pair of cams retained by the cam retaining elements, each cam including an off-axis opening, a rotation of the cam causes the plates to move relative to the suspension member to cause the suspension member to move relative to the control arm.

3. The system of claim 2, wherein each cam retaining element includes a pair of elements that are elevated relative to a surface of the plates.

4. The system of claim 3, wherein the elevated element are disposed at a distance from each other that is slightly less than or equal to an outer diameter of the cams.

5. The system of claim 1, wherein the cam is round.

6. The system of claim 1, wherein the the plate has a threaded connector, the second bolt receivable in the threaded connector to fixedly couple the plate to the control arm.

7. The system of claim 1, further comprising a second suspension member coupled to the control arm.

8. The system of claim 7, wherein the system is configured such that the relative movement of the control arm with respect to both the suspension member and the second suspension member causes an adjustment to the camber of the suspension system.

9. The system of claim 7, wherein the system is configured such that the relative movement of the control arm with respect to one of the suspension member and the second suspension member causes an adjustment to the caster of the suspension system.

10. A method for adjusting at least one of camber and a caster of a suspension system, the suspension system including a control arm having at least one opening, a suspension member coupled to the control arm, at least one plate including an opening, a slot and a cam retaining element, at least one cam retained by the cam retaining element and including an off-axis opening, a bolt extending through the slot and through the off-axis opening in the cam, and second bolt extending through the at least one opening in the control arm and the opening in the plate, comprising the steps of:

loosening the bolt and the second bolt;

rotating the cam so as to cause the plate to move relative to the suspension member to cause relative movement between the suspension member and the control arm.

11. The method of claim 10, wherein the plate includes a threaded connection, the second bolt receivable in the threaded connection, the method further comprising the step of engaging the second bolt with the threaded connection such that the plate is fixedly coupled to the control arm.

12. The method of claim 10, further comprising the step of coupling a second suspension member to the control arm.

13. The method of claim 12, further comprising the step of adjusting the camber of the suspension system by causing relative movement of the control arm with respect to both the suspension member and the second suspension member.

14. The method of claim 12, further comprising the step of adjusting the caster of the suspension system by causing relative movement of the control arm with respect to one of the suspension member and the second suspension member.

\* \* \* \* \*